United States Patent
Masuyama

(10) Patent No.: US 6,700,611 B1
(45) Date of Patent: Mar. 2, 2004

(54) AMPLIFYING SOLID-STATE IMAGING DEVICE, AND METHOD FOR DRIVING THE SAME

(75) Inventor: Masayuki Masuyama, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/438,584

(22) Filed: Nov. 12, 1999

(30) Foreign Application Priority Data

Nov. 16, 1998 (JP) .......................................... 10-324739

(51) Int. Cl.$^7$ ................................................ H04N 3/14
(52) U.S. Cl. ...................................... 348/300; 348/296
(58) Field of Search ................................. 348/300, 294, 348/296, 301

(56) References Cited

U.S. PATENT DOCUMENTS

| | | | |
|---|---|---|---|
| 6,239,839 B1 | * | 5/2001 | Matsunaga et al. .......... 348/308 |
| 6,469,740 B1 | * | 10/2002 | Kuroda et al. ............... 348/308 |
| 6,512,543 B1 | * | 1/2003 | Kuroda et al. ............... 348/294 |
| 6,522,357 B2 | * | 2/2003 | Beiley et al. ................ 348/308 |

FOREIGN PATENT DOCUMENTS

| | | | | |
|---|---|---|---|---|
| JP | 63-127679 | * | 5/1988 | .......... H04N/5/335 |
| JP | 03-276675 | * | 12/1991 | .......... H01L/27/146 |
| JP | 04-142889 | * | 5/1992 | .......... H04N/5/335 |
| JP | 05-227489 | | 9/1993 | |
| JP | 05-316431 | | 11/1993 | |
| JP | 06-334923 | | 12/1994 | |
| JP | 6-339073 | | 12/1994 | |
| JP | 7-284024 | | 10/1995 | |
| JP | 08-293591 | | 11/1996 | |
| JP | 10-93864 | | 4/1998 | |
| JP | 2000-101608 | * | 4/2000 | .......... H04L/12/28 |

* cited by examiner

Primary Examiner—Wendy R. Garber
Assistant Examiner—Jacqueline Wilson
(74) Attorney, Agent, or Firm—McDermott, Will & Emery

(57) ABSTRACT

A time an $i^{th}$ row reset signal $RS_i$ is generated and sent out for electronic shuttering is shifted from a conventionally defined time. In this manner, it is possible to avoid overlapping between a period during which the reset signal $RS_i$ is provided and a period during which an $n^{th}$ pixel row is selected to perform a readout operation thereon (i.e., a period when a row select signal $SL_n$ is at "High" level). As a result, reset potentials, which could otherwise be variable depending on whether or not readout operation is being performed on any other row, can be equalized among all the rows, thus eliminating the cause of horizontal noise.

10 Claims, 11 Drawing Sheets

RSi : ON
SLi : OFF
SLn : OFF  ALL ROW SELECT
TRANSISTORS TURNED OFF

RSi : OFF
SLi : ON
SLn : OFF $i^{th}$ ROW SOURCE FOLLOWER CURRENT : Id

RSi : ON
SLi : ON
SLn : OFF

RSi : OFF
SLi : ON
SLn : OFF

AMPLIFYING SOLID-STATE IMAGING DEVICE, AND METHOD FOR DRIVING THE SAME

BACKGROUND OF THE INVENTION

The present invention relates to an amplifying solid-state imaging device and a method for driving the same.

An amplifying solid-state imaging device, as well as a CCD solid-state imaging device, adopts "electronic shuttering" as a sort of electronic diaphragm. The "electronic shuttering" operation is performed to reset a signal charge storage section just before a photodiode in each pixel starts to store the signal charge, which has been created by the photodiode itself through photoelectric conversion, thereby making the charge storage period of the photodiode variable. The signal charge stored in pixels is read out on a row-by-row basis responsive to a horizontal sync signal. Thus, the electronic shuttering operation is also performed on the row-by-row basis (which is called a "focal plane operation"). More specifically, the electronic shuttering operation is performed on a certain row and then the signal charge starts to be stored. And after a predetermined time has passed since the start of charge storage, a signal readout operation is performed. When the readout operation is started, the storage section is reset again for the readout. The "predetermined time" defines the charge storage period of each photodiode and is of an equal length for every row. Accordingly, supposing each pixel is receiving light with the same intensity, the same quantity of charge will be stored on each and every row theoretically speaking.

FIG. 1 illustrates a schematic configuration of a conventional amplifying solid-state imaging device 100. In the device 100, an imaging section is made up of a plurality of pixels 102 arranged in columns and rows. Each of these pixels 102 includes a photodiode for storing charge in a quantity corresponding to the amount of light received. As shown in FIG. 1, a row select encoder 103 for selecting one pixel row after another from the imaging section is disposed on the right-hand side of the imaging section. In the example illustrated in FIG. 1, the number of pixel rows is m, which is equal to or larger than two. The row select encoder 103 includes the number m of row selectors that are connected in series to each other. An $i^{th}$ (where $1 \leq i \leq m$) row selector generates a reset signal for the electronic shuttering operation at a predetermined time, and then sends the signal out to all the pixels 102 belonging to the $i^{th}$ row. The row selectors included in the row select encoder 103 output the reset signal for the electronic shuttering operation at respective times, which are different from each other among the rows. That is to say, the reset signal is sequentially output in the descending order, i.e., from the first through $m^{th}$ pixel rows.

On the other hand, the row selecting operation for readout (i.e., an ordinary row selection) is also performed sequentially by the number m of row selectors. The interval between the electronic shuttering and readout operations is preset at the same length for every row. The signal read out from a selected row is supplied by a column select driver 107 to an output buffer 111, from which the signal is output as a pixel signal.

When the electronic shuttering operation is performed, the photodiode within each pixel 102 has the potential thereof compulsorily reset at a predetermined level (which will be called a "reset potential" in this specification). The reset potential is supposed to be the same in each and every pixel 102 as a matter of principle. However, the present inventors found that since a reset potential on a certain row could shift into a different reset potential on another row, horizontal noise might appear on the screen as a result. The horizontal noise always appears on a particular set of rows on the screen, thus degrading the resultant image quality.

SUMMARY OF THE INVENTION

An object of the present invention is providing (1) an amplifying solid-state imaging device that can substantially eliminate the horizontal noise resulting from the electronic shuttering operation and (2) a method for driving the device.

To achieve this object, according to the present invention, a reset signal for electronic shuttering is generated and sent out at a time different from a conventionally defined one such that the reset signal for electronic shuttering is not provided while a pixel row is being selected to read a signal therefrom. As a result, the reset potentials, which would otherwise be variable depending on whether or not signal reading is being performed on other rows, can be equalized among all the pixel rows, thus eliminating the cause of the horizontal noise.

DETAILED DESCRIPTION OF THE INVENTION

Hereinafter, preferred embodiments of an amplifying solid-state imaging device according to the present invention will be described with reference to the accompanying drawings.

Figure 1:
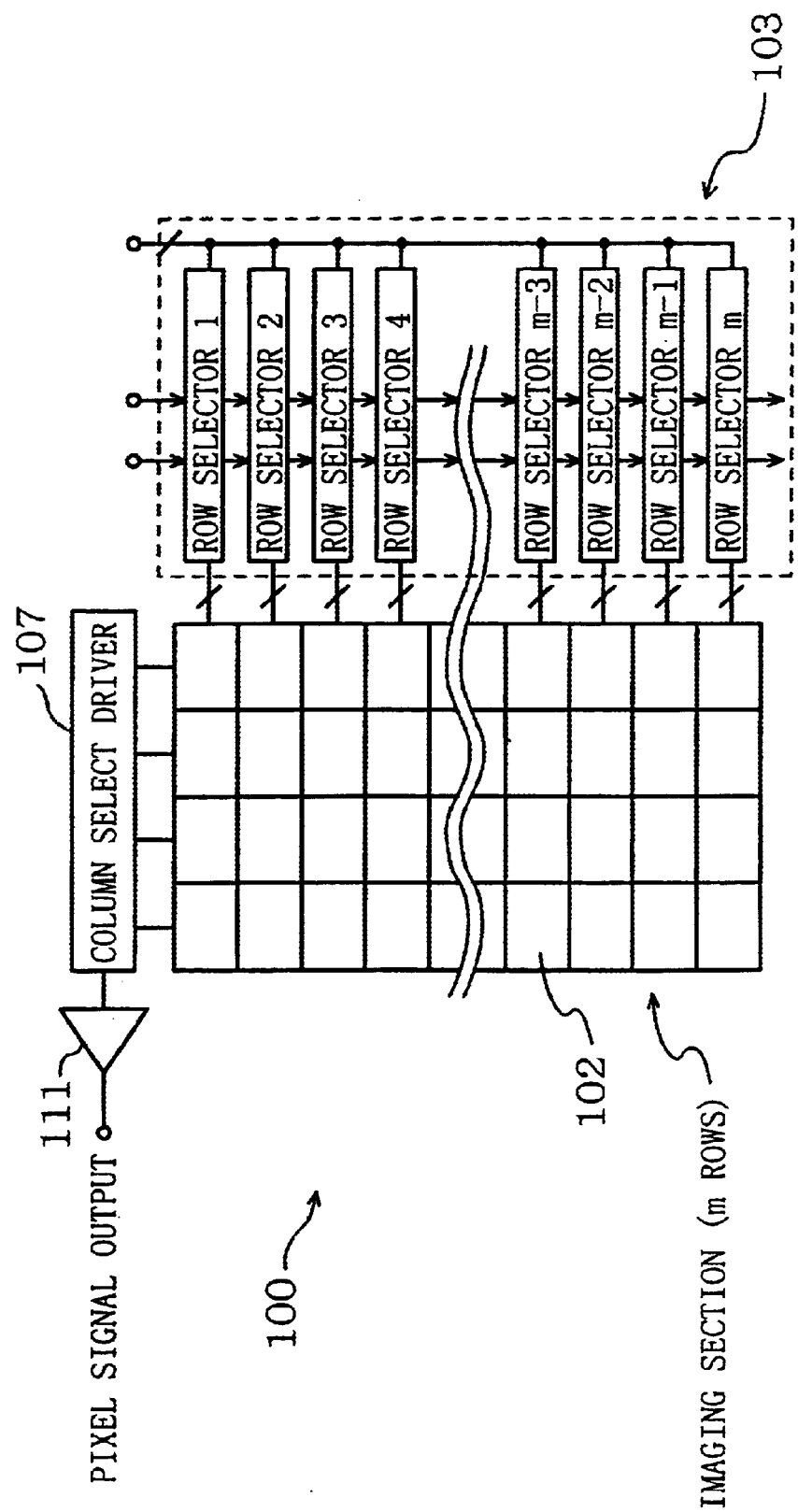
FIG. 1 illustrates a schematic configuration of a conventional amplifying solid-state imaging device.
Figure 2:
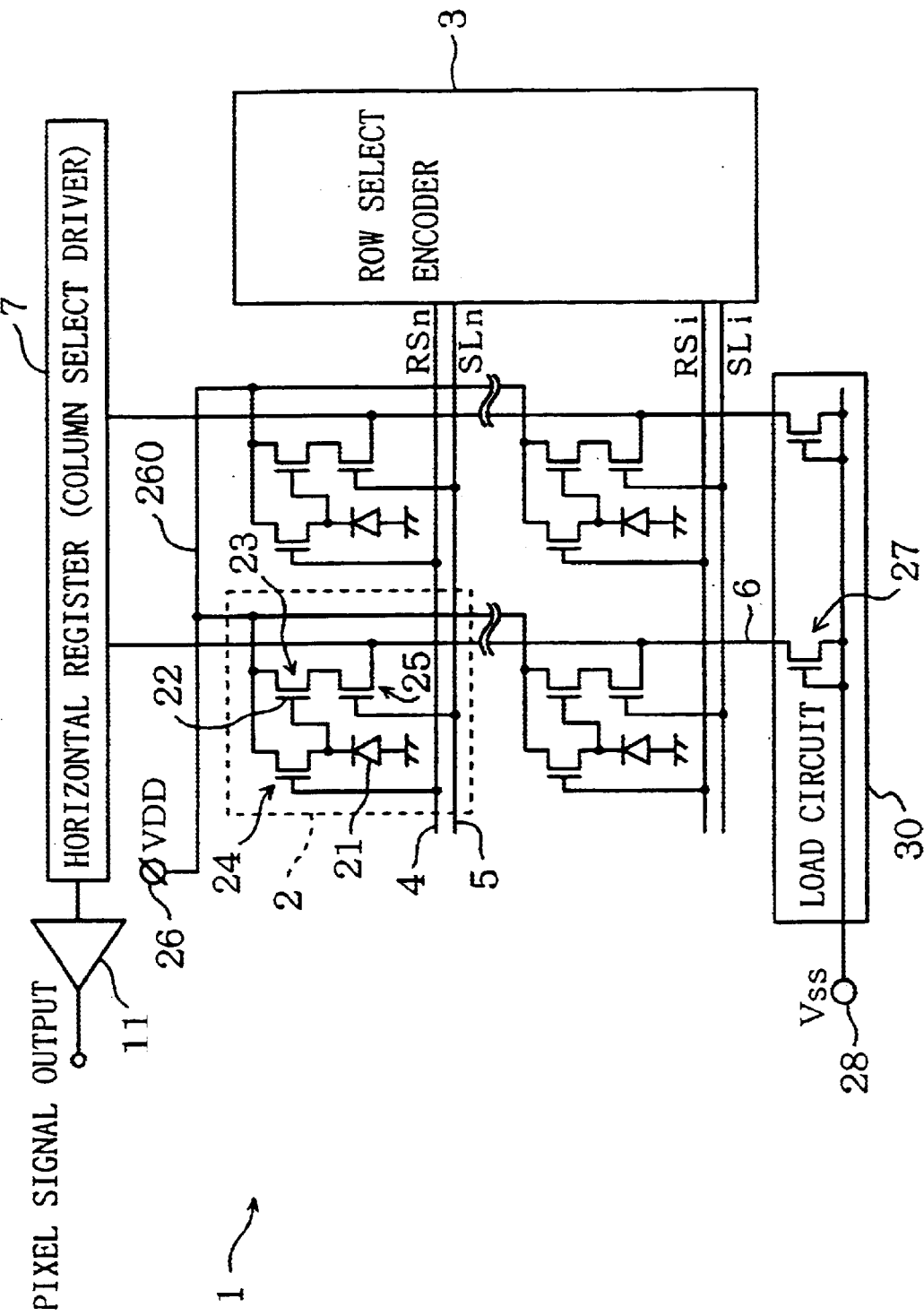
FIG. 2 illustrates a detailed configuration of a pixel in an amplifying solid-state imaging device according to an exemplary embodiment of the present invention.

FIG. 2 illustrates a configuration of an amplifying solid-state imaging device 1 according to an exemplary embodiment of the present invention. The device 1 includes a plurality of pixels 2 arranged in matrix, i.e., in columns and rows, on a semiconductor substrate such as a silicon substrate. Although a 2×2 matrix of pixels 2 is illustrated in FIG. 2, a great number of pixels are actually formed in columns and rows. In this specification, the respective numbers of rows and columns of pixels provided within an effective pixel area to generate pixel signals are represented by m and l, both of which are positive integers equal to or larger than two. In a typical solid-state imaging device, m and l are both within the range from 50 to 2,000. In this embodiment, m and l are supposed to be 480 and 640, respectively.

Each of these pixels 2 includes a signal storage section, which in turn includes a photoelectric transducer like a photodiode. Responsive to light incident on the photoelectric transducer, each signal storage section can store information, corresponding to the intensity of the light received, as a "potential or quantity of charge". Although each photoelectric transducer is in a first or third potential state (reset potential) during resetting, a state transition subsequently takes place from the first or third into a second potential state as a result of creation and storage of charge responsive to the incident light. The second potential state is represented by a level variable with the intensity of the incoming light. In this specification, the "second potential state" is variable with the total amount of light that has been incident on the pixel 2 after resetting was performed as the electronic shuttering operation. A more detailed internal configuration of each pixel 2 will be described later.

The device 1 includes a plurality of lines and circuits for selecting and accessing a particular one of the pixels 2. these lines, circuits, transistors provided as components of each pixel and so on are formed on a substrate by various techniques similar to well known ones for fabricating a semiconductor integrated circuit. In this embodiment, a row select encoder 3 is electrically connected to all of the pixels 2 through plural pairs of reset and row select lines 4 and 5. Each single reset line 4 is connected to all of the pixels 2 belonging to a single row associated with the reset line 4. In the same way, each single row select line 5 is also connected to all of the pixels 2 belonging to a single row associated with the row select line 5. That is to say, the number of the pairs of lines 4 and 5, extending from the row select encoder 3, is equal to the number of the pixel rows in the matrix.

To select a particular one of the rows, the row select encoder 3 selectively changes the potential on a row select line 5 associated with the particular row from logically "Low" into "High", for example. In this case, the potentials on the other row select lines 5 associated with the remaining rows are held at logically "Low". As a result, a potential, corresponding to the logically "High" state, is applied to the respective control terminals of switching devices in all the pixels 2 included in the particular row, thereby turning these switching devices ON. Upon the activation of the switching devices, potentials, corresponding to the information that has been stored on respective signal storage sections on the selected row, appear on an associated vertical signal lines 6. In this case, the signal storage section of each pixel 2 is electrically disconnected from an associated vertical signal line 6 on the remaining rows other than the selected one. The configuration and operation of a circuit for sensing information this way will be described in greater detail later.

The information, which has been stored in the signal storage sections of all the pixels 2 included in a selected row, is output to all the corresponding vertical signal lines 6 and then read out column by column by a horizontal shift register (column select driver) 7. The information is ultimately output as a signal through an output buffer (output amplifier) 11.

Next, the configuration of each pixel 2 according to this embodiment will be described in further detail. As shown in FIG. 2, the pixel 2 includes: a photodiode 21 functioning as a signal storage section; and an MOS transistor 23, whose gate electrode 22 is connected to the photodiode 21. The photodiode 21 is implementable as a pn junction diode formed in a silicon substrate, for example. The MOS transistor 23 may have an ordinary MOS structure including channel, source and drain regions within a silicon substrate, for example. The MOS transistor 23 functions as an amplifier (driver) in a signal sensing circuit, which plays an important role in amplifying and reading out a tiny variation in the potential state of the photodiode 21. In the following description, the MOS transistor 23 will be called "amplifier". In the illustrated embodiment, no capacitor is particularly inserted between the gate electrode 22 of the amplifier 23 and the photodiode 21. Optionally, a capacitor may be inserted therebetween.

The pixel 2 further includes a resetting device 24 and a switching device 25. The resetting device 24 is an MOS transistor (reset transistor), whose gate electrode is connected to an associated reset line 4. The drain of the MOS transistor 24 is connected to a first power supply terminal ($V_{DD}$) 26 through a power line 260, and the source thereof is connected to the photodiode 21. When the potential on the reset line 4 associated with the selected row is selectively changed by the row select encoder 3 from logically "Low" into "High", the resetting devices 24 on the selected row turn ON. As a result, the charge stored on the photodiodes 21 is drained toward the first power supply terminal ($V_{DD}$) 26 through the power line 260. The potential at each photodiode 21, i.e., that at the gate electrode 22 of the amplifier 23, is compulsorily reset at a certain value determined by the supply potential $V_{DD}$ at the first power supply terminal 26. After this reset operation is finished, the potential at the photodiode 21 gradually varies with the intensity of light received by the pixel 2. It is because carriers are created due to the photoelectric conversion function of the photodiode 21 and then stored in the photodiode 21 that the potential state of the photodiode 21 is variable with the incidence of light.

The switching device 25 in each pixel 2 is an MOS transistor, whose gate electrode is connected to an associated row select line 5. The drain of the MOS transistor 25 is connected to the source of the amplifier 23 and the source thereof is connected to an associated vertical signal line 6. When the potential on the row select line 5 shown in FIG. 2 is selectively changed by the row select encoder 3 from logically "Low" into "High", the switching device 25 turns ON. As a result, current flows from the first power supply terminal ($V_{DD}$) 26 through the amplifier 23, switching device 25, vertical signal line 6 and load device 27 into a second power supply terminal ($V_{SS}$) 28. In this case, the potential on the vertical signal line 6 is variable with the potential state of the photodiode 21 (i.e., the potential at the gate electrode 22 of the amplifier 23). Accordingly, the potential on the vertical signal line 6 has a level variable with the second potential state at the signal storage section of the pixel 2.

Considering a particular column, the amplifier 23, belonging to the selected row, and an associated load device 27 are connected in series to each other between the first and second power supply terminals ($V_{DD}$) 26 and ($V_{SS}$) 28 to form a source follower circuit. In other words, a single load device 27 is allocated to each column, and each amplifier 23 on the selected row is electrically connected to an associated load device 27 via an associated switching device 25. Such a source follower circuit can amplify the quantity of signal charge stored in each pixel and then output the charge as a potential signal. In this specification, the load devices 27 corresponding to all the columns will sometimes be called a "load circuit" 30 collectively.

To utilize the chip area effectively, the same power is supplied from the first power supply terminal ($V_{DD}$) 26 through the common power line 260 to the photodiodes 21 for the resetting purpose, and to the source follower circuits.

Figure 3:
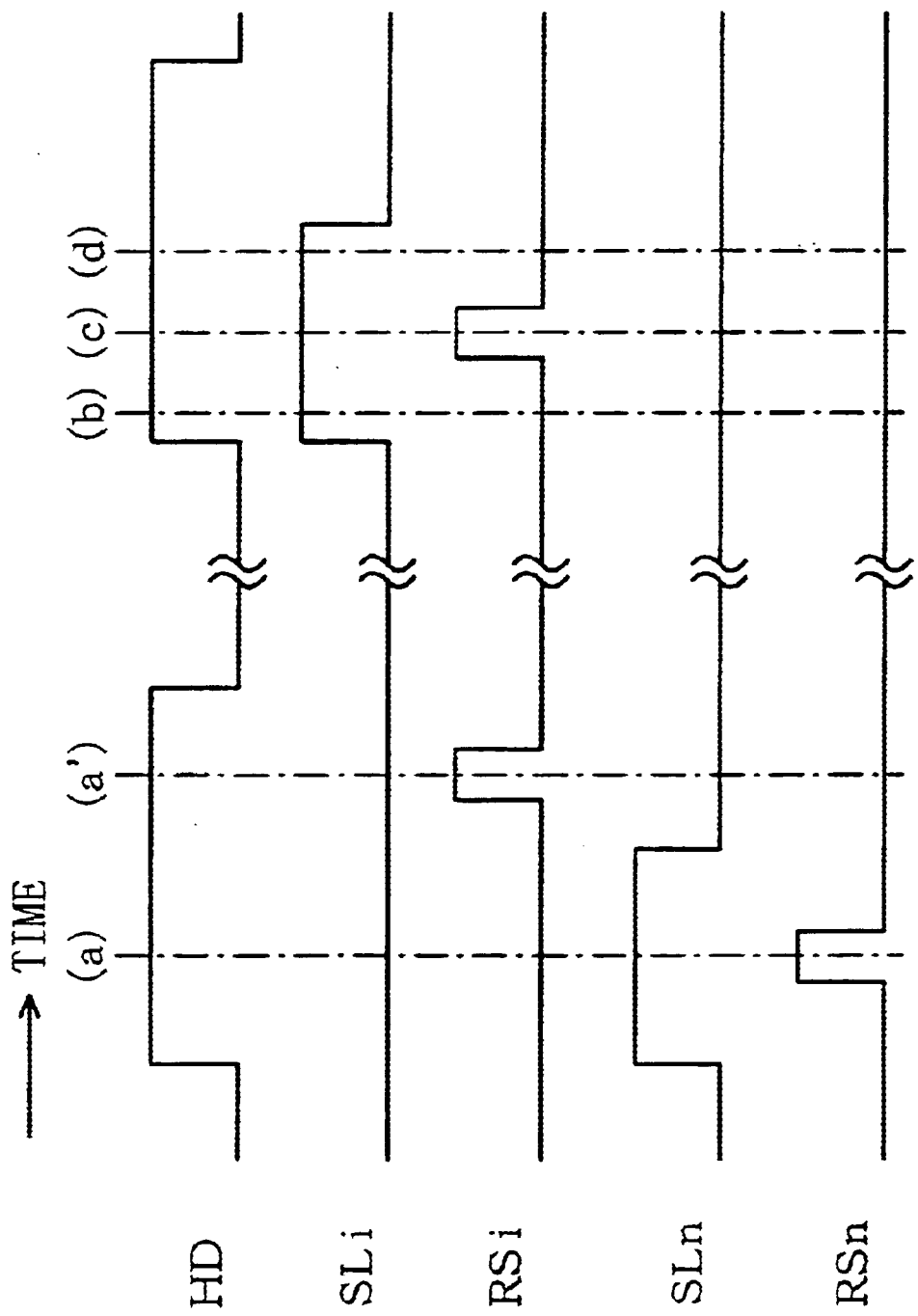
FIG. 3 is a timing diagram illustrating some control signals associated with $i^{th}$ and $n^{th}$ rows of the amplifying solid-state imaging device of the present invention, where $1 \leq i \leq m$ and $n \neq i$.

Hereinafter, it will be described in detail why the horizontal noise disappears according to this embodiment. FIG. 3 is a timing diagram illustrating some control signals associated with an arbitrary $i^{th}$ row, where $1 \leq i \leq m$, and an $n^{th}$ row, where $n \neq i$. The pulses HD shown as the uppermost waveform in FIG. 3 are those of a horizontal sync signal.

First, at a time a, a row select signal $SL_i$ remains "Low" and the switching devices 25 on the $i^{th}$ row are kept OFF. A reset signal $RS_i$ also remains "Low". In the example illustrated in FIG. 3, a readout operation is being performed on another row (i.e., the $n^{th}$ row) at the time a as will be described later. However, it is not always necessary to perform the readout operation on some row at the time a.

Next, at a time a', resetting is performed on the $i^{th}$ row as electronic shuttering. That is to say, although the row select signal $SL_i$ is still "Low" at the time a', the reset signal $RS_i$ has risen to the "High" level. Thus, the switching devices 25 on the $i^{th}$ row are kept OFF, while the MOS transistors, which function as the resetting devices 24 on the $i^{th}$ row, have been turned ON and are now conducting. As a result, the first power supply terminal ($V_{DD}$) 26 is electrically connected to the photodiodes 21, and the charge that has been stored on the photodiodes 21 is drained toward the first power supply terminal ($V_{DD}$) 26. By performing the reset operation in this manner, the potential in the charge storage region of each of these photodiodes 21 is compulsorily reset at the first potential. According to the conventional technique, a period during which resetting is performed as electronic shuttering overlaps with a period during which reading is performed on another row. In other words, resetting for electronic shuttering is performed at the time a, not at the time a'. Resetting for electronic shuttering has been performed concurrently with resetting for signal reading. This is because such concurrent resetting is easier than discrete resetting and because effects attainable by discrete resetting have never been appreciated so far.

Next, at a time b, a readout operation is being performed on the $i^{th}$ row. The readout operation is started by turning the switching devices 25 on the $i^{th}$ row ON with the rise of the row select signal $SL_i$ from the "Low" into "High" level. While the switching devices 25 on the $i^{th}$ row are conducting, current flows from the first power supply terminal ($V_{DD}$) 26 toward the second power supply terminal ($V_{SS}$) 28 through the vertical signal lines 6 as described above. As a result, a signal potential, corresponding to the quantity of charge that has been created and stored on the pixels on the $i^{th}$ row between the time a' during resetting for electronic shuttering and the time b, is output onto the vertical signal lines 6.

Subsequently, at a time c, the reset signal $RS_i$ has risen from the "Low" into the "High" level, thereby turning the resetting devices 24 on the $i^{th}$ row ON. On the other hand, the switching devices 25 on the $i^{th}$ row are still kept ON. Since the reset signal $RS_i$ has risen to the "High" level, the MOS transistors, which function as the resetting devices 24 on the $i^{th}$ row, have also been turned ON and are now conducting. As a result, the first power supply terminal ($V_{DD}$) 26 is electrically connected to the photodiodes 21, and the charge that has been stored on the photodiodes 21 is drained toward the first power supply terminal ($V_{DD}$) 26.

Then, at a time d, the potential state of the photodiodes 21 after resetting is sensed. This sensing operation is performed in the same way as that performed at the time b before resetting. And based on a change in potential state of the photodiodes 21 before and after resetting at the time c, the information that has been stored on the pixels is read out as a signal.

As described above, according to this embodiment, resetting for electronic shuttering is performed on the $i^{th}$ row at the time a', which is out of the period during which a readout operation may be performed on another row (e.g., the $n^{th}$ row). That is to say, a time the reset signal for electronic shuttering is generated and sent out is shifted from the conventionally defined time. As a result, a period during which the reset signal for electronic shuttering is provided does not overlap with a period during which a pixel row is selected to perform a readout operation thereon.

In the example illustrated in FIG. 3, the row select signal $SL_n$ has risen from the "Low" into "High" level at the time a, and current flows from the first power supply terminal ($V_{DD}$) 26 toward the second power supply terminal ($V_{SS}$) 28 through the vertical signal lines 6 as described above. As a result, a signal potential, corresponding to the quantity of charge that has been stored on the pixels on the $n^{th}$ row, is output onto the vertical signal lines 6.

Hereinafter, the potential states of a photodiode 21 on the $i^{th}$ row during these operations will be described with reference to FIGS. 4 through 7.

Figure 4:
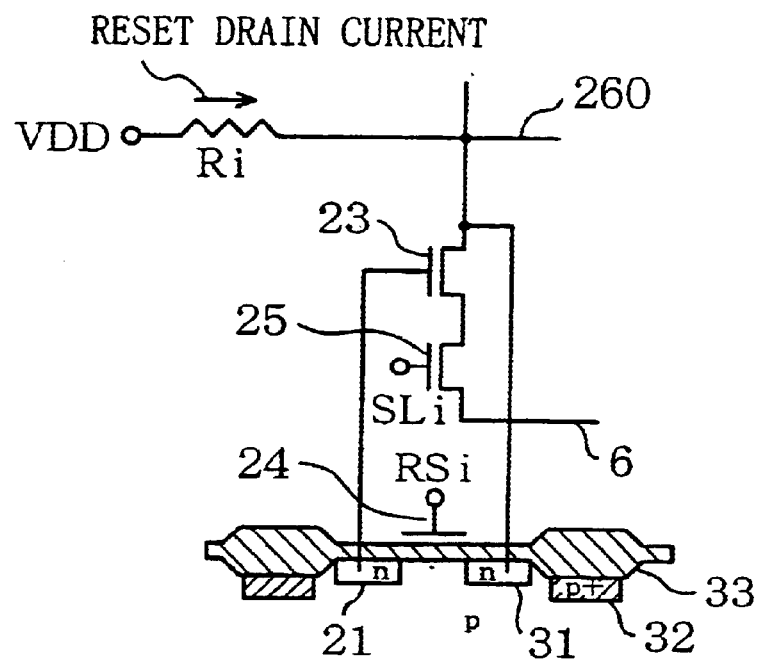
FIGS. 4, 4A, 5, 5A, 6, 6A, 7 and 7A illustrate an equivalent circuit of a pixel on the $i^{th}$ row, a schematic cross-sectional structure of the resetting device and a distribution of surface potentials at the times a', b, c and d shown in FIG. 3, respectively.
Figure 4A:
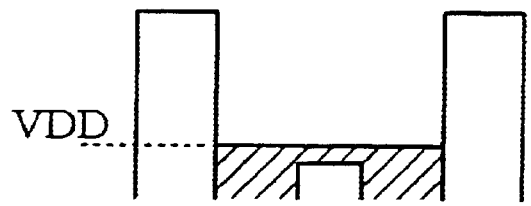

FIGS. 4 and 4A illustrate an equivalent circuit of a pixel on the $i^{th}$ row, a schematic cross-sectional structure of the resetting device 24 and a distribution of surface potentials at the time a'. In the example illustrated in FIGS. 4 and 4A, the resetting device 24 is implemented as an n-channel MOS transistor. An n-type doped region of the photodiode 21 also functions as the source region of the resetting device 24. The resetting device 24 is surrounded by a field oxide 33 such as a LOCOS film. A channel stopper 32 doped with a p-type dopant is formed under the field oxide 33.

At the time a', resetting for electronic shuttering is being performed. Accordingly, the potential at the photodiode 21 (more specifically, a surface potential of the n-type doped regions of the photodiode 21) is substantially equal to a potential in the drain region 31 of the resetting device 24 (hereinafter, simply referred to as a "reset drain 31"). The reset drain 31 is connected to the first power supply terminal ($V_{DD}$) 26 through the power line 260. According to this embodiment, even if the readout operation is performed on the $n^{th}$ row, the readout operation has already been finished before the time a'.

While the readout operation is being performed on the $n^{th}$ row, source follower current $I_d$ flows through the power line 260. This current $I_d$ is much larger than the current flowing from the first power supply terminal ($V_{DD}$) 26 to the photodiode 21 on the $i^{th}$ row as a result of resetting the photodiode 21 (hereinafter, this current will be referred to as "reset drain current"). For example, the source follower current $I_d$ flowing through the load circuit 30 is on the orders of several to several hundreds $\mu A$, whereas the reset drain current is on the orders of several to several hundreds fA. Supposing the principal resistance of the power line is represented as $R_i$, a voltage drop of $I_d \times R_i$ is caused in the power supplied to the reset drain 31. Thus, the potential at the reset drain 31 is represented as $V_{DD}' = V_{DD} - I_d \times R_i$.

The interconnection resistance of the common power line 260 differs depending on the layout thereof, but is ordinarily on the orders of several tens $\Omega$ to several k$\Omega$. Suppose the source follower current $I_d$ per pixel is 10 μA, the reset drain current is 10 fA and the interconnection resistance of the common power line 260 is 1 kΩ, for instance. In such a case, the voltage drop of the power supplied to the pixel while the reset drain current is flowing is 10 fA×1 kΩ=10 pV. On the other hand, the voltage drop of the power supplied to the pixel while the source follower current is flowing is 10 μA×1 kΩ=10 mV. As can be seen, since the reset drain current is negligible compared to the source follower current, the effects of the voltage drop thereof are also negligible.

At the time a, the source follower current is flowing through the switching devices 25 on the $n^{th}$ row. In contrast, at the time a', none of the switching devices 25 are conducting. Accordingly, the potential at the reset drain 31 at the time a' is substantially equal to $V_{DD}$, no matter whether or not readout operation has been performed on any other row at the time a.

Figure 5:
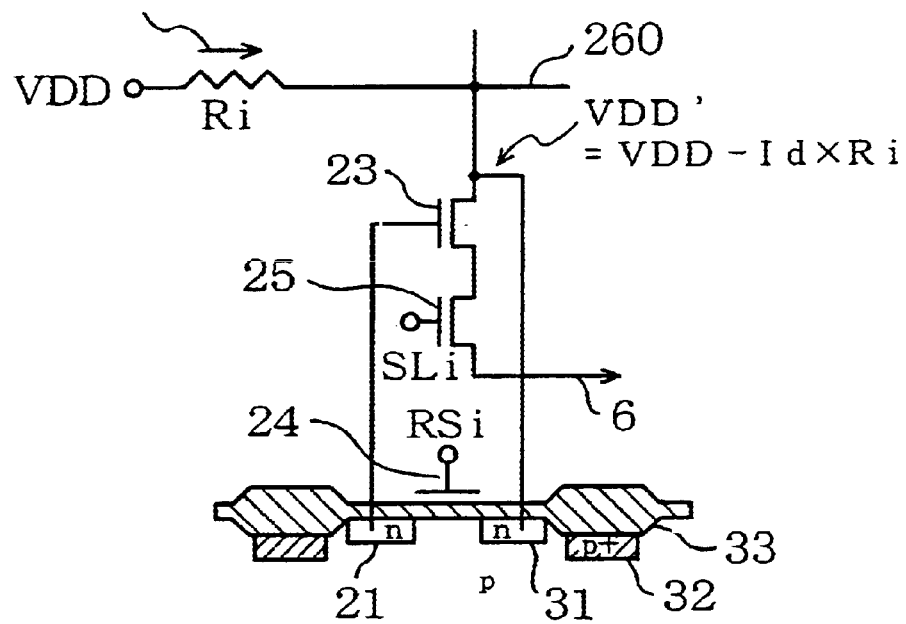
Figure 5A:
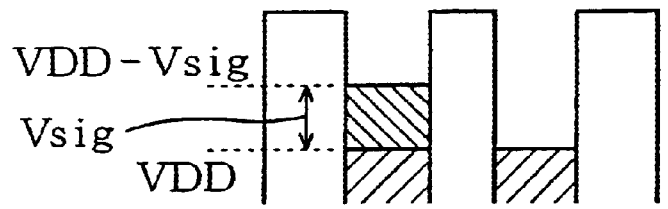

Next, referring to FIGS. 5 and 5A, charge has been stored in the photodiode 21 at the time b, when the potential thereof is $(V_{DD}-V_{sig})$ that has decreased by $V_{sig}$ from the potential $V_{DD}$ at the time of resetting. The magnitude of $V_{sig}$ is determined depending on the quantity of charge that has been created and stored through photoelectric conversion. This potential $(V_{DD}-V_{sig})$ is applied to the gate electrode of the amplifier 23. Also, at the time b, the readout operation on the $i^{th}$ row has already been started, and the source follower current $I_d$ is now flowing through the power line 260. This current $I_d$ flows from the first power supply terminal $(V_{DD})$ 26 through the amplifier 23 and switching device 25 on the $i^{th}$ row into the load circuit 30.

Figure 6:
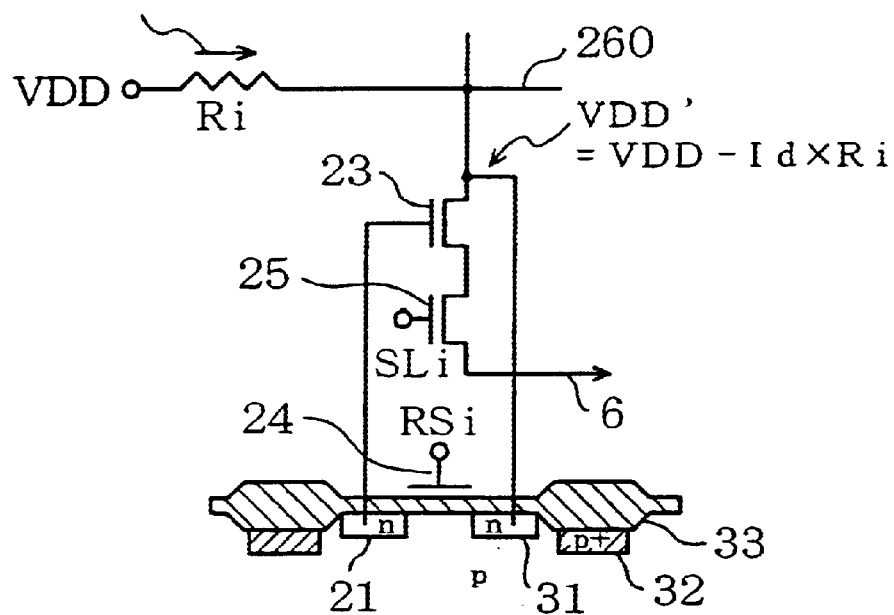
Figure 6A:
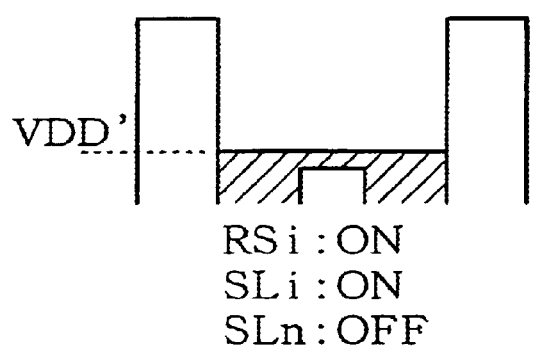

Then, referring to FIGS. 6 and 6A, since resetting for readout operation is being performed at the time c, the resetting device 24 has turned ON and the charge that has been stored on the photodiode 21 is being drained toward the first power supply terminal $(V_{DD})$ 26. As a result, the potential at the photodiode 21 is equalized with the potential $V_{DD}'(=V_{DD}-I_d\times R_i)$ of the reset drain 31. The potential $V_{DD}'$ is applied to the gate electrode of the amplifier 23. Accordingly, a signal potential corresponding to the potential $V_{DD}'$ starts to appear on the vertical signal line 6.

Figure 7:
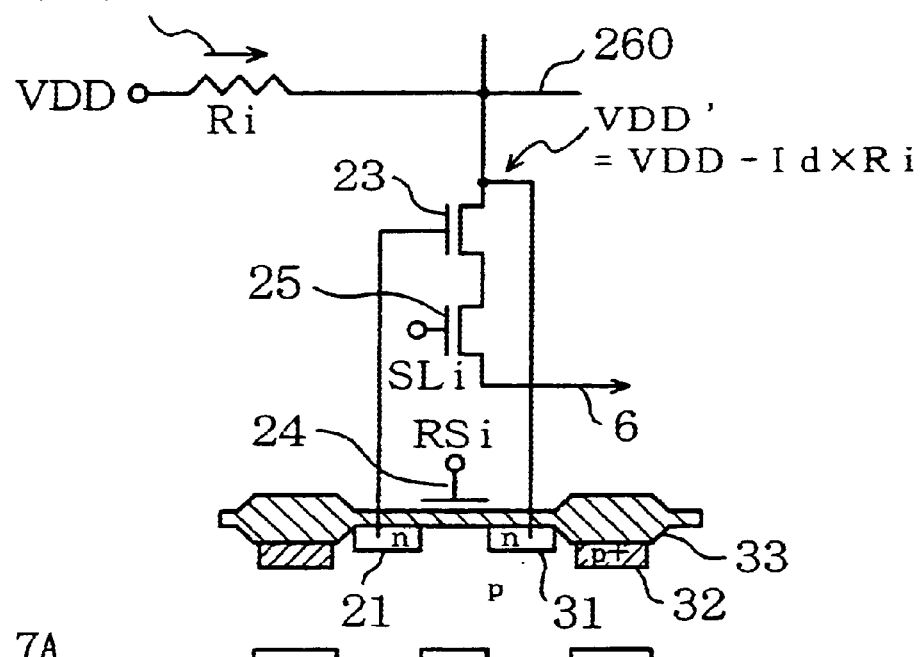
Figure 7A:
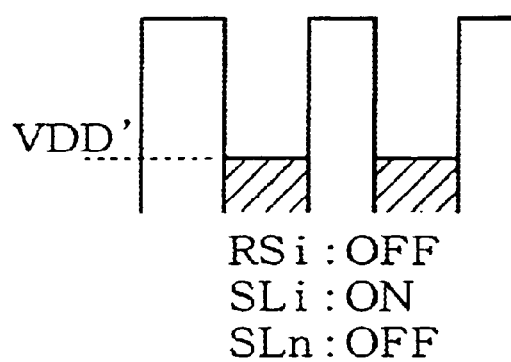

Subsequently, referring to FIGS. 7 and 7A, the resetting device 24 has been turned OFF again at the time d. Immediately after resetting, the potential $V_{DD}'$ was applied to the gate electrode of the amplifier 23. Accordingly, a signal potential corresponding to the potential $V_{DD}'$ appears on the vertical signal line 6. As a result, the signal information sensed from the pixel on the $i^{th}$ row has a magnitude represented as $V_{DD}'-(V_{DD}-V_{sig})$.

As described above, according to this embodiment, the potential at the photodiode 21 is compulsorily reset at $V_{DD}$ by resetting for electronic shuttering. If a light blocking metal film made of aluminum, for example, is used as the power line 260 to isolate the respective pixels from each other, then the potentials $V_{DD}$ can be substantially equalized among all the rows. In other words, the variation in reset potential between a pair of pixel rows can be suppressed. As a result, an image of high quality with reduced horizontal noise can be provided.

In the foregoing embodiment, a time (e.g., the time a') resetting is performed for electronic shuttering is shifted on the time axis from a time (e.g., the time a) a pixel row is selected to perform a readout operation thereon as described above. The configuration of the row select encoder 3 to perform these operations will be described later.

In contrast, there is no interval between the times a and a' in the conventional amplifying solid-state imaging device.

Figure 10:
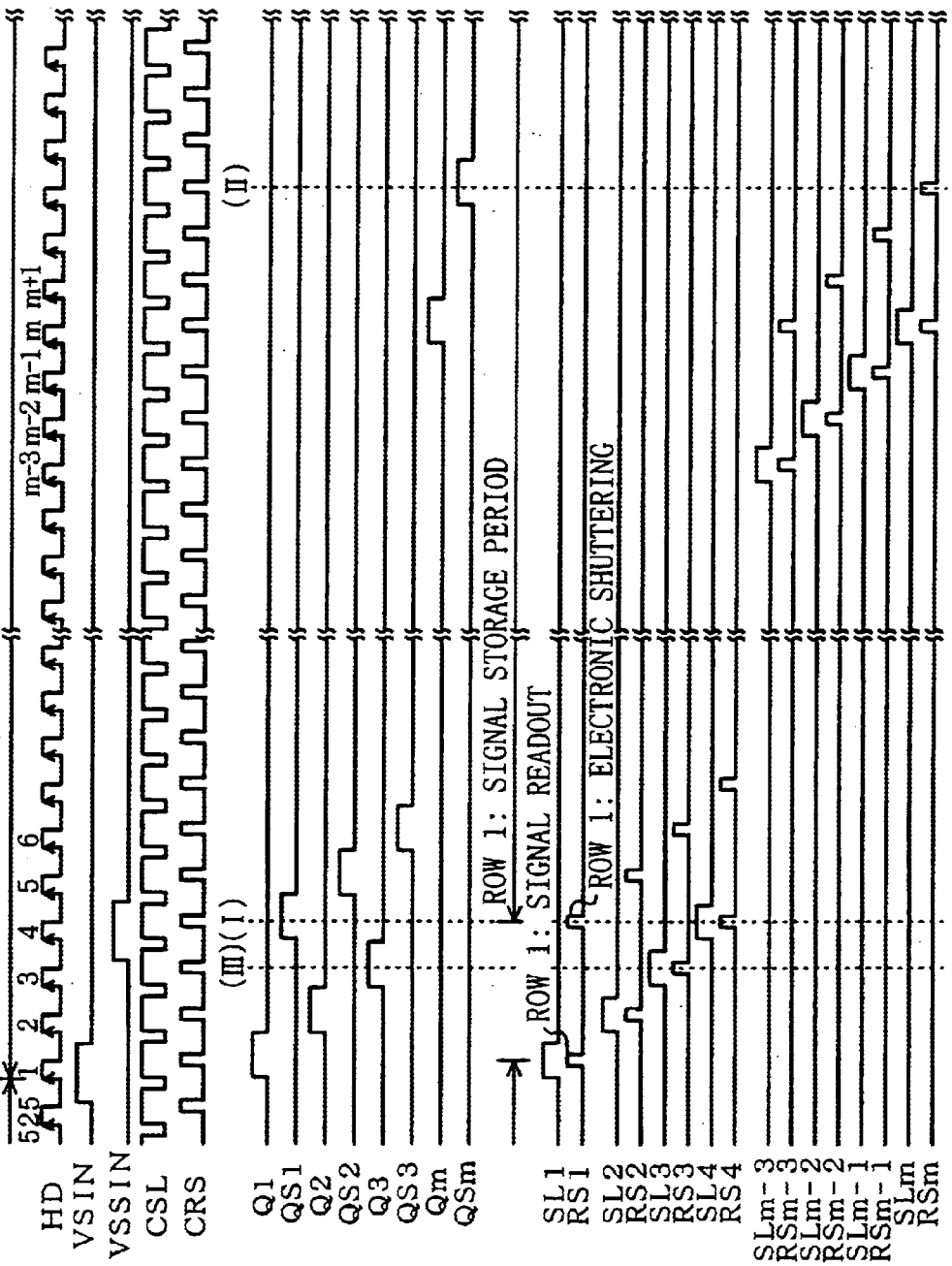
FIG. 10 is a timing diagram illustrating control signals sent out by a row select encoder in a conventional amplifying solid-state imaging device.

That is to say, a period during which resetting is performed for electronic shuttering overlaps with a period during which readout operation is performed on another row. FIG. 10 illustrates a timing diagram of various control signals for the conventional amplifying solid-state imaging device. As can be seen from FIG. 10, resetting for electronic shuttering on a particular row and readout on any other row might be performed concurrently. However, while resetting for electronic shuttering is being performed on another particular row, no readout operation might be being performed on any other row. As shown in FIG. 10, resetting for electronic shuttering is being performed on the first row and a readout operation is being performed on the fourth row at a time I. At a time II, resetting for electronic shuttering is being performed on an $m^{th}$ row, but no readout operation is being performed on any other row. Accordingly, in the conventional device, a variation in reset potential corresponding to the potential difference $(V_{DD}'-V_{DD})$ is caused among the output signals of respective rows, thus causing horizontal noise. At a time III, readout operation is being performed, but resetting for electronic shuttering is not. Even so, no horizontal noise is caused.

Figure 8:
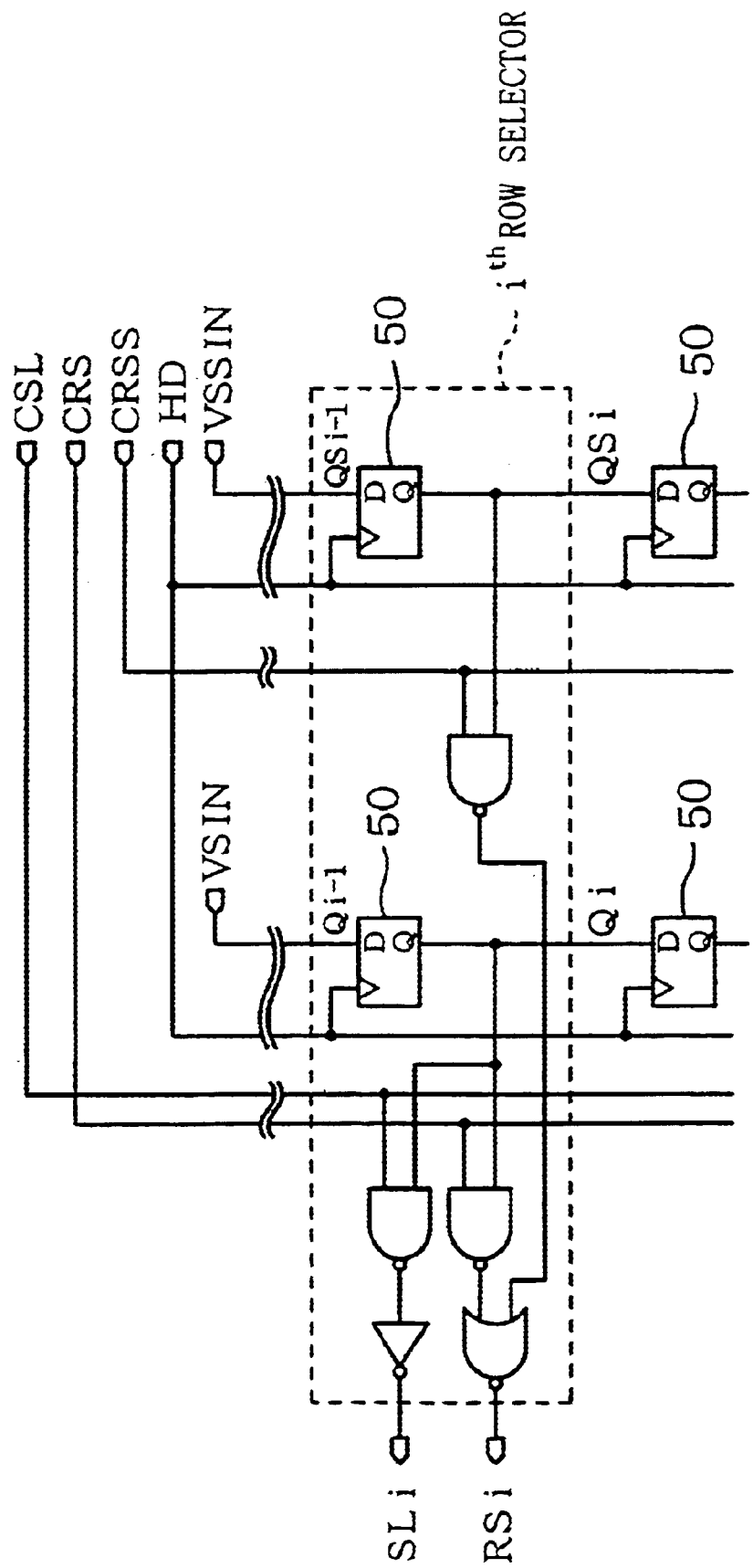
FIG. 8 is a circuit diagram illustrating a configuration of an $i^{th}$ row selector in the row select encoder preferably adopted according to the present invention.

FIG. 8 illustrates a row selector associated with an $i^{th}$ row and included in the row select encoder 3 preferably adopted according to this embodiment. The row selectors associated with the first through $m^{th}$ rows, each having the configuration shown in FIG. 8, are connected in series together to form the row select encoder 3. The row select encoder 3 includes two banks of vertical shift registers, i.e., first and second shift registers. Each vertical shift register includes a plurality of flip-flop circuits 50, which are connected in series to each other.

In FIG. 8, VSIN is a signal getting a row selecting operation for signal reading started by the row select encoder 3. VSSIN is a signal getting a row selecting operation for electronic shuttering started by the row select encoder 3. The signals VSIN and VSSIN are input to the row select encoder 3 once a frame interval. CSL is a selection sync signal defining respective times the readout operation should be performed, while CRS is a reset sync signal defining respective times the reset operation should be performed for signal reading. CRSS is a reset sync signal defining respective times the reset operation should be performed for electronic shuttering. The signal CRSS is provided at a time shifted from the time the signal CRS is provided. The row select encoder 3 receives these signals and generates various types of control signals in synchronism with the horizontal sync signal HD, thereby performing the electronic shuttering and row selecting operations.

The $1^{st}$-row part of the first shift register receives the horizontal sync signal HD and the start pulse signal VSIN provided as a trigger of the readout operation. The output $Q_i$ of the $i^{th}$-row part of the first shift register is provided to the D terminal of the flip-flop circuit 50 included in the $(i+1)^{st}$-row part of the first shift register. In this manner, the first shift register sequentially performs such an output operation from the first through the last rows in synchronism with the horizontal sync signal HD. On the other hand, the $1^{st}$-row part of the second shift register receives the horizontal sync signal HD and the start pulse signal VSSIN provided as a trigger of the electronic shuttering operation. he output $QS_i$ of the $i^{th}$-row part of the second shift register is provided to the D terminal of the flip-flop circuit 50 included in the $(i+1)^{st}$-row part of the second shift register. In this manner, the second shift register also performs a similar output operation sequentially from the first through the last rows in synchronism with the horizontal sync signal HD.

Figure 9:
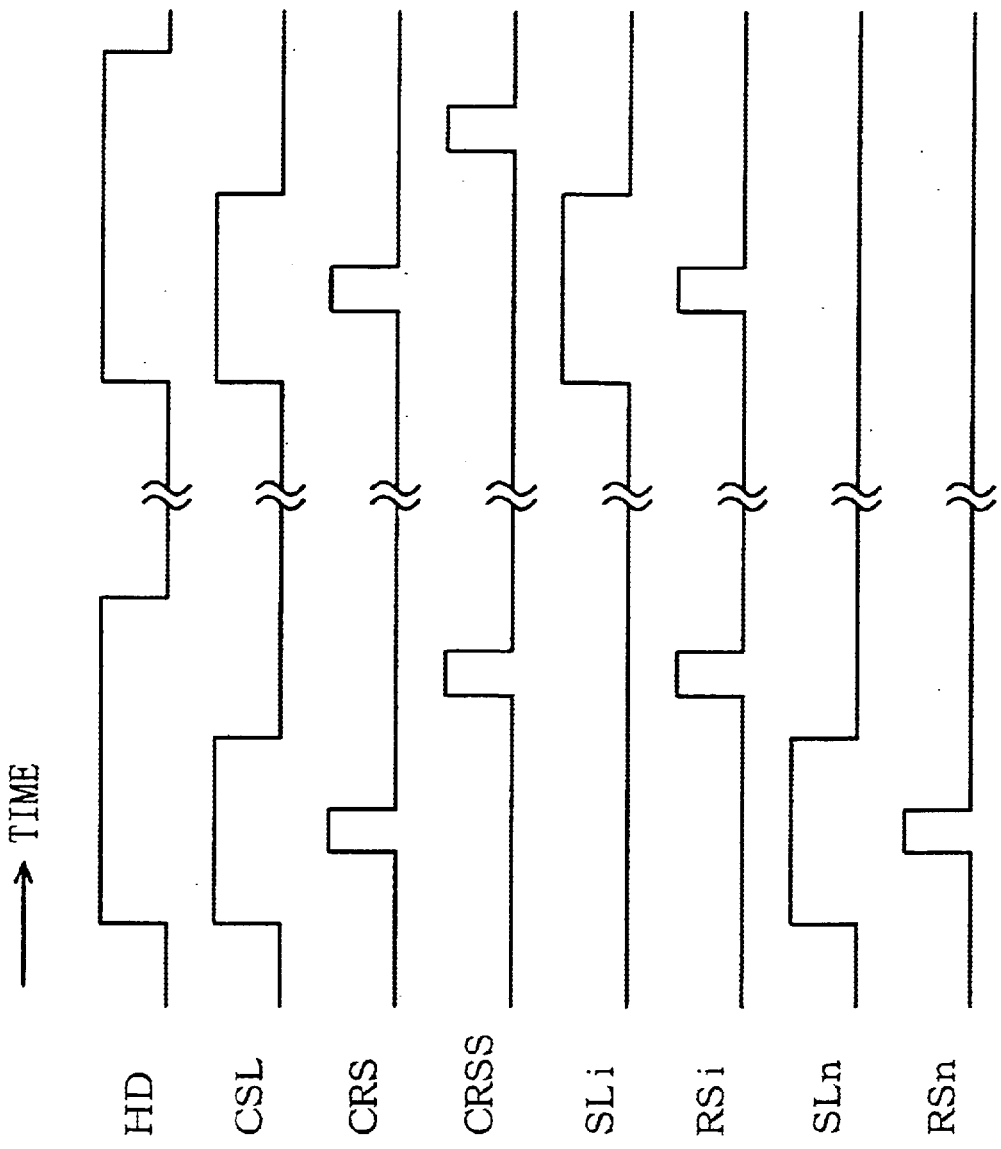
FIG. 9 is a timing diagram, which is a more detailed version of that illustrated in FIG. 3.

Based on the outputs $Q_i$ and $QS_i$ of the first and second shift registers, the selection sync signal CSL and the reset sync signals CRS and CRSS, the row select encoder 3 generates the row select signal $SL_i$ and reset signal $RS_i$ at respective times such as those shown in FIG. 9. Then, the row select encoder 3 provides these control signals to the pixels on the $i^{th}$ row through the row select and reset lines 5 and 4 associated with the $i^{th}$ row. On the top of FIG. 9, the waveform of the horizontal sync signal HD is illustrated. In synchronism with the horizontal sync signal HD, the row selectors send out the row select signals $SL_1$ through $SL_m$ and reset signals $RS_1$ through $RS_m$ to associated rows. It is noted that the time progresses rightward in FIG. 9.

While the signal VSIN (not shown in FIG. 9) is being at the logically "High" level, a first pulse of the horizontal sync signal HD is supplied as the first HD for the frame interval in question. Thereafter, when the $525^{th}$ HD is supplied, the frame interval ends. And when the signal VSIN rises to the "High" level again after that, the next frame interval starts.

In synchronism with the first HD, the row select encoder 3 generates the row select signal $SL_1$ and the reset signal $RS_1$ and sends these control signals out to the pixels on the first row to perform a readout operation on the pixels belonging to the first row. Thereafter, in synchronism with the second HD, the row select encoder 3 generates the row select signal $SL_2$ and the reset signal $RS_2$ and sends these control signals out to the pixels on the second row to perform a readout operation on the pixels belonging to the second row. A similar operation will be sequentially performed on the remaining rows.

On the other hand, in synchronism with the horizontal sync signal HD supplied while the signal VSSIN is being at the logically "High" level, the row select encoder 3 generates the reset signal $RS_1$ and sends the signal out to the pixels on the first row. As a result, resetting for electronic shuttering is carried out on all the pixels belonging to the first row. Thereafter, in synchronism with the next HD pulse, the row select encoder 3 generates the reset signal $RS_2$ and sends the signal out to the pixels on the second row. As a result, resetting for electronic shuttering is carried out on all the pixels belonging to the second row. A similar operation will be sequentially performed on the remaining rows.

As can be seen, by generating and sending out a reset signal for electronic shuttering and a reset signal for signal reading at respectively different times, the horizontal noise involved with the prior art device can be eliminated easily.

In the foregoing embodiment, the reset signal for electronic shuttering is generated within the row select encoder 3 used for readout operation and then output therefrom. However, the present invention is in no way limited to such a specific embodiment. For example, a circuit for generating the reset signal for electronic shuttering may be disposed on the left-hand side of the imaging section shown in FIG. 2. And a circuit for outputting a control signal for signal reading (row selectors) may be disposed on the right-hand side of the imaging section. Also, the disposition of these circuits may be inverted horizontally.

Figure 11:
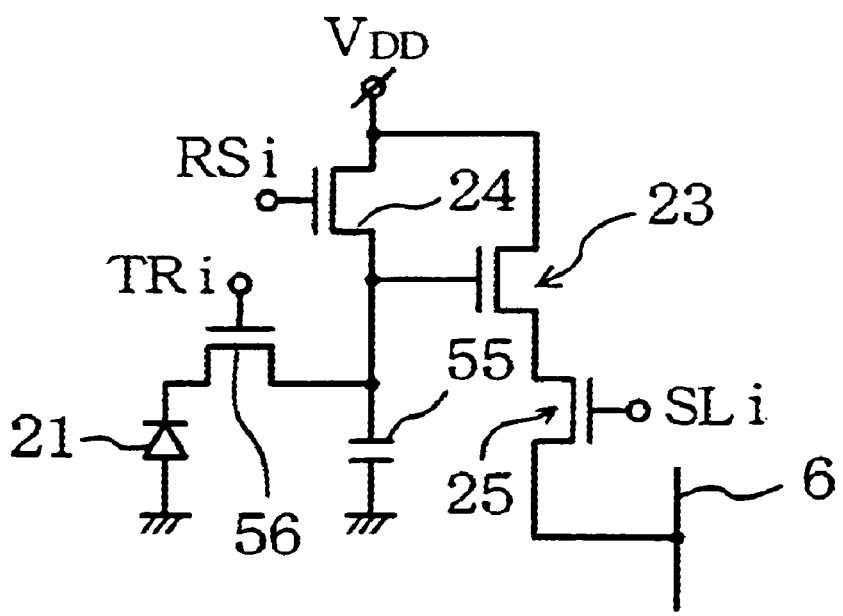
FIG. 11 is a circuit diagram illustrating another exemplary pixel configuration usable according to the present invention.

Moreover, according to the present invention, a pixel with a configuration shown in FIG. 11 may also be used. In the pixel shown in FIG. 11, a transfer gate 56 is provided in addition to the photodiode 21 within the signal storage section and a potential of a capacitor 55, which is connected to a signal storage node, is applied to the gate electrode of the amplifier 23. In other words, the source follower circuit senses a potential at the signal storage node. As can be seen, the present invention is not limited to the pixel configuration exemplified in the foregoing embodiment. In FIG. 11, a signal $TR_1$ is supplied to the transfer gate 56 for controlling the ON/OFF states thereof.

The present invention is generally applicable to any MOS solid-state imaging device of such a type as amplifying and sensing signal charge stored on a pixel by making current flow through a load circuit. For example, a signal sensing circuit may be constructed using an inverter instead of the source follower circuit. The key point is that the sensing circuit is at least required to sense, amplify and output a quantity of signal charge stored within a pixel before and after resetting.

In the foregoing embodiment, the row select encoder 3 includes two banks of vertical shift registers. Thus, the rows are selected sequentially in a physical space. Alternatively, a row select encoder for accessing rows located at physically random positions one after another may also be used.

What is claimed is:

1. An amplifying solid-state imaging device comprising:
a group of pixels arranged in columns and rows, each said pixel including
signal storing means for creating signal charge through photoelectric conversion and storing thereon signal information corresponding to the signal charge created,
signal detecting means for sensing the signal information from the signal storing means and providing the information sensed as an output signal, and
resetting means for resetting the signal information stored on the signal storing means responsive to a reset signal;
row selecting means for selecting at least one first pixel row from the group of pixels and performing a readout operation of reading out the output signals of the signal detecting means in the respective pixels belonging to the first pixel row; and
reset signal sending means for selecting at least one second pixel row from the group of pixels and sending out the reset signal to the resetting means in the respective pixels belonging to the second pixel row, thereby resetting the signal storing means on the second pixel row,
wherein the signal detecting means is connected between first and second power supplies so as to sense the signal information and output the information sensed as the output signal when current flows between the first and second power supplies, and
wherein the reset signal sending means sends out the reset signal to the second pixel row to perform electronic shuttering on the second pixel row in a period not overlapping with a period during which the row selecting means selects the first pixel row to perform the readout operation on the first pixel row.

2. The imaging device of claim 1, wherein the reset signal sending means is included within a circuit block for the row selecting means.

3. The imaging device of claim 1, wherein amplifying means for amplifying the signal information is made up of the signal detecting means associated with each said pixel and a load device provided for each said column of pixels.

4. The imaging device of claim 3, wherein the signal detecting means is a transistor with a gate electrode connected to the signal storing means, a drain connected to the first power supply and a source connected to the load device.

5. The imaging device of claim 3, wherein a source follower circuit is made up of the signal detecting means and the load device.

6. The imaging device of claim 1, wherein the signal storing means comprises: a photodiode for creating the signal charge through the photoelectric conversion; a capacitor for storing the charge created by the photodiode; and a transistor for selectively connecting or disconnecting electrically the photodiode to/from the capacitor.

7. An amplifying solid-state imaging device comprising:
a group of pixels arranged to form a plurality of pixel rows, each said pixel including signal storing means for creating signal charge through photoelectric conversion and storing thereon signal information corresponding to the signal charge created, signal detecting means for sensing the signal information from the signal storing means and providing the information sensed as an output signal, and resetting means for resetting the signal information stored on the signal storing means responsive to a reset signal;

row selecting means for selecting a first pixel row from the group of pixels and reading out the output signals of the signal detecting means in the respective pixels belonging to the first pixel row; and reset signal sending means for selecting a second pixel row from the group of pixels and sending out the reset signal to the resetting means in the respective pixels belonging to the second pixel row, thereby resetting the signal storing means on the second pixel row, wherein the first pixel row, which is different from the second pixel row, is selected and a readout operation is performed on the first pixel row in a period during which the reset signal is not provided to the second pixel row and no electronic shuttering operation is performed on the second pixel row.

8. A method for driving an amplifying solid-state imaging device, the device comprising:

a group of pixels arranged to form a plurality of pixel rows, each said pixel including signal storing means for creating signal charge through photoelectric conversion and storing thereon signal information corresponding to the signal charge created, signal detecting means for sensing the signal information from the signal storing means and providing the information sensed as an output signal, and resetting means for resetting the signal information stored on the signal storing means responsive to a reset signal;

row selecting means for selecting a first pixel row from the group of pixels and performing a readout operation of reading out the output signals of the signal detecting means in the respective pixels belonging to the first pixel row; and reset signal sending means for selecting a second pixel row from the group of pixels and sending out the reset signal to the resetting means in the respective pixels belonging to the second pixel row, thereby resetting the signal storing means on the second pixel row, wherein the method comprises the step of selecting the first pixel row, which is different from the second pixel row, and performing the readout operation on the first pixel row in a period during which the reset signal is not provided to the second pixel row and no electronic shuttering operation is performed on the second pixel row.

9. A method for driving an amplifying solid-state imaging device, the device comprising:

a group of pixels arranged to form a plurality of pixel rows, each said pixel including signal storing means for creating signal charge through photoelectric conversion and storing thereon signal information corresponding to the signal charge created, signal detecting means for sensing the signal information from the signal storing means and providing the information sensed as an output signal, and resetting means for resetting the signal information stored on the signal storing means responsive to a reset signal;

row selecting means for selecting a first pixel row from the group of pixels and performing a readout operation of reading out the output signals of the signal detecting means in the respective pixels belonging to the first pixel row; and reset signal sending means for selecting a second pixel row from the group of pixels and sending out the reset signal to the resetting means in the respective pixels belonging to the second pixel row, thereby resetting the signal storing means on the second pixel row, wherein in a first horizontal retrace interval, the reset signal is provided to the second pixel row to perform an electronic shuttering operation on the second pixel row in a period during which no readout operation is performed on the group of pixels, and wherein in a period included in a second horizontal retrace interval succeeding the first horizontal retrace interval, a readout operation is performed on the second pixel row, and the reset signal is provided to one of the pixel rows other than the second pixel row to perform the electronic shuttering operation on the pixel row in another period of the second horizontal retrace interval other than the period during which the readout operation is performed on the second pixel row.

10. A method for driving an amplifying solid-state imaging device, the device comprising:

a group of pixels arranged in columns and rows, each said pixel including signal storing means for storing thereon signal charge in a quantity variable with the amount of light received, signal detecting means for sensing the signal charge from the signal storing means and providing the charge sensed as an output signal, and resetting means for resetting the signal charge stored on the signal storing means responsive to a reset signal;

row selecting means for selecting at least one first pixel row from the group of pixels and performing a readout operation of reading out the output signals of the signal detecting means in the respective pixels belonging to the first pixel row; and reset signal sending means for selecting at least one second pixel row from the group of pixels and sending out the reset signal to the resetting means in the respective pixels belonging to the second pixel row, thereby resetting the signal storing means on the second pixel row, wherein in a first horizontal retrace interval, the reset signal sending means sends out the reset signal to the second pixel row to perform an electronic shuttering operation on the second pixel row in a period not overlapping with a period during which the row selecting means selects the first pixel row to perform the readout operation on the first pixel row, thereby establishing a first potential state on the second pixel row, and wherein in a second horizontal retrace interval succeeding the first horizontal retrace interval, after a second potential state on the second pixel row has been sensed while the readout operation is being performed on the second pixel row, the reset signal sending means sends out the reset signal to the second pixel row, thereby resetting the second pixel row and establishing a third potential state on the second pixel row, the second and third potential states being used as signal information.

* * * * *